No. 720,698. PATENTED FEB. 17, 1903.
T. C. JOHNSON.
GAS OPERATED FIREARM.
APPLICATION FILED JUNE 23, 1902.
NO MODEL. 5 SHEETS—SHEET 1.
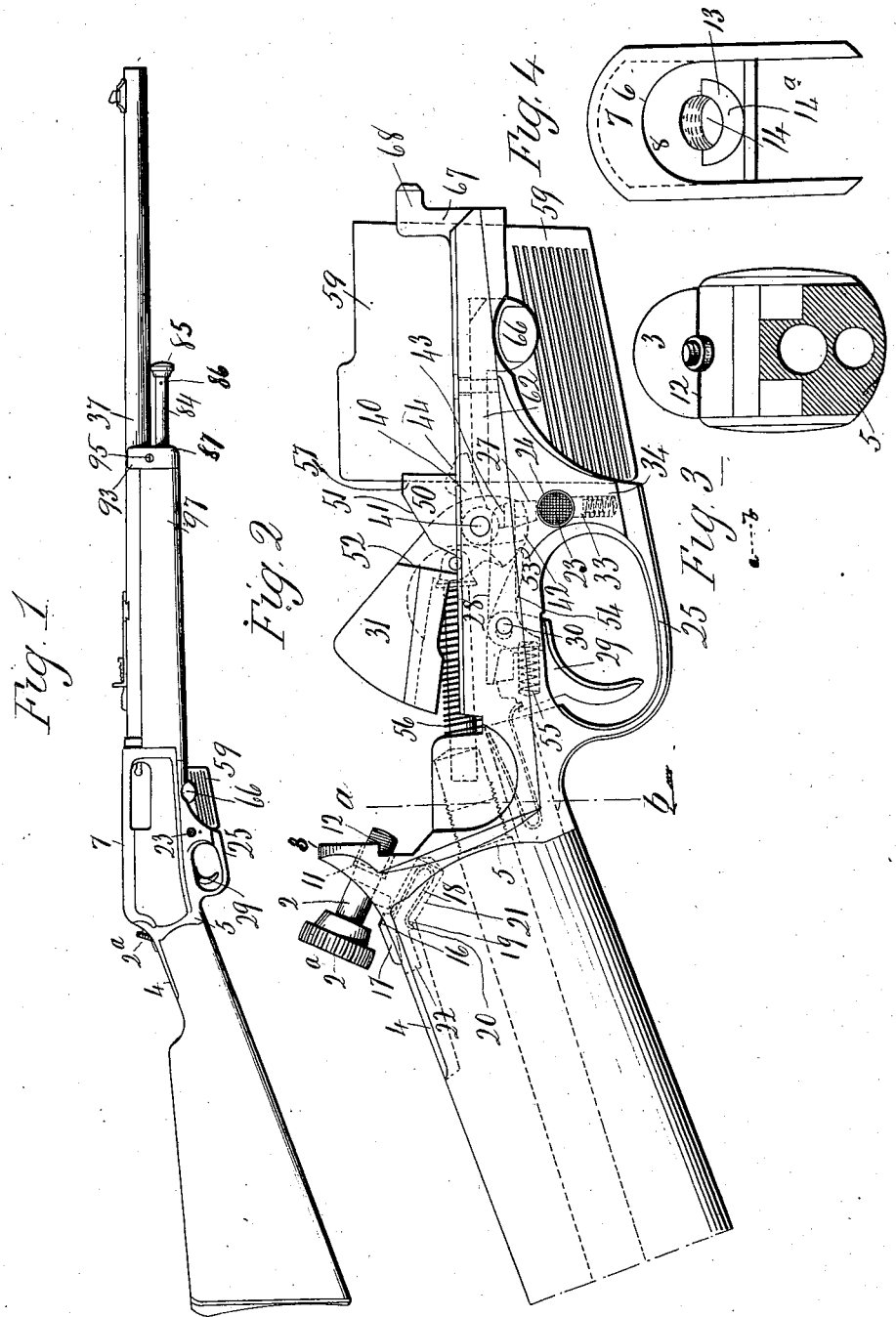

No. 720,698. PATENTED FEB. 17, 1903.
T. C. JOHNSON.
GAS OPERATED FIREARM.
APPLICATION FILED JUNE 23, 1902.
NO MODEL. 5 SHEETS—SHEET 2.
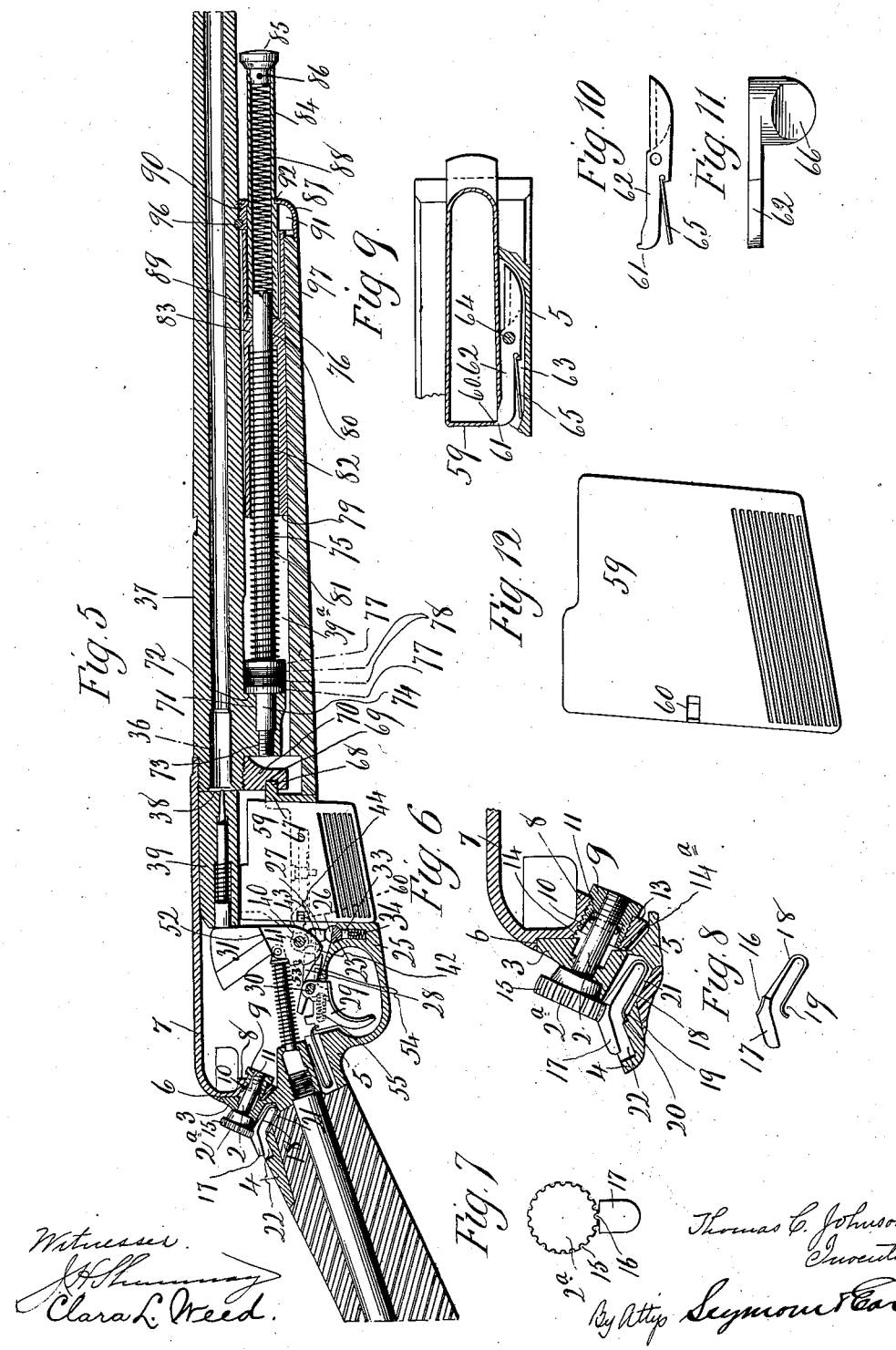

No. 720,698. PATENTED FEB. 17, 1903.
T. C. JOHNSON.
GAS OPERATED FIREARM.
APPLICATION FILED JUNE 23, 1902.
NO MODEL. 5 SHEETS—SHEET 3.
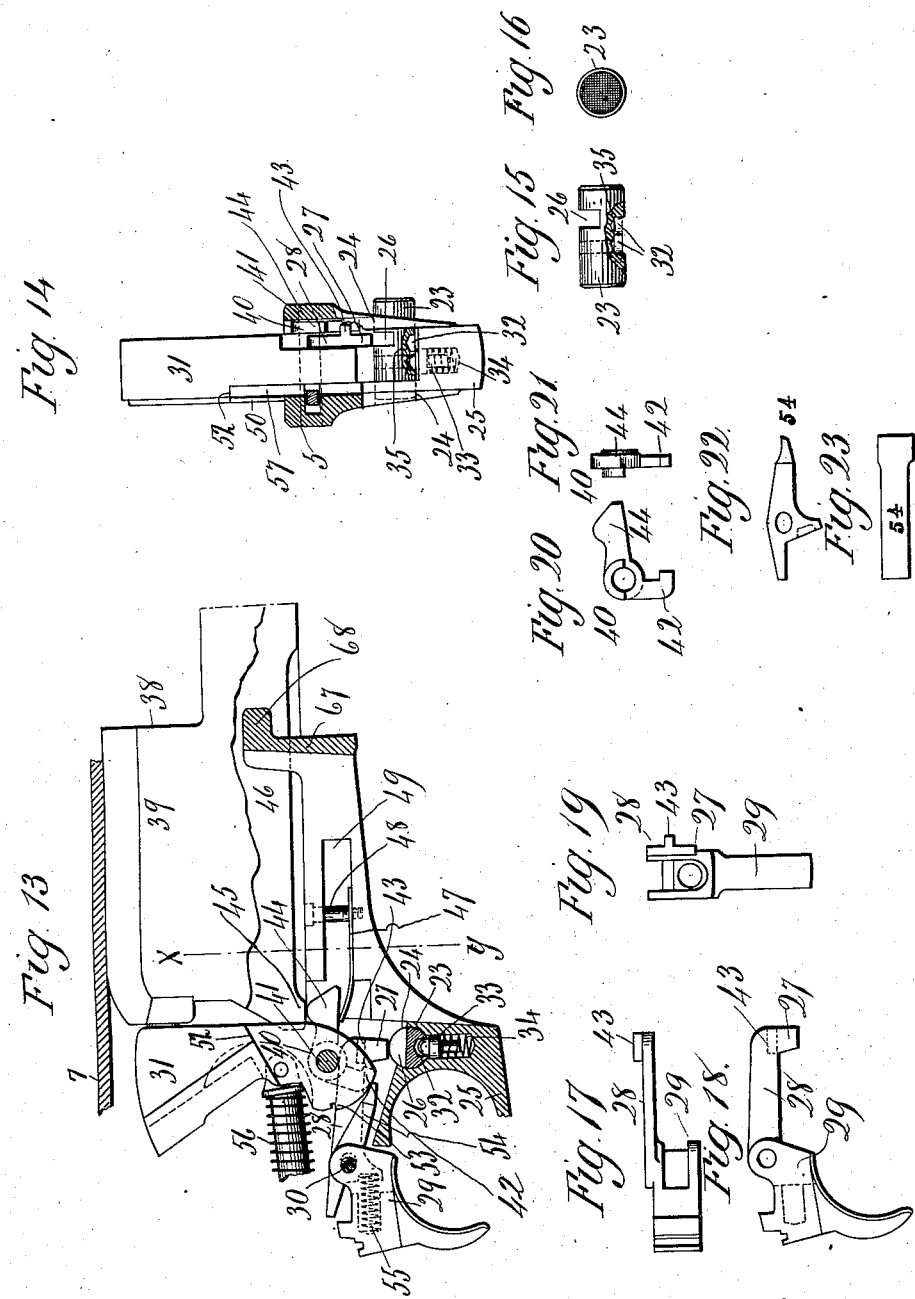

No. 720,698. PATENTED FEB. 17, 1903.
T. C. JOHNSON.
GAS OPERATED FIREARM.
APPLICATION FILED JUNE 23, 1902.
NO MODEL. 5 SHEETS—SHEET 4.
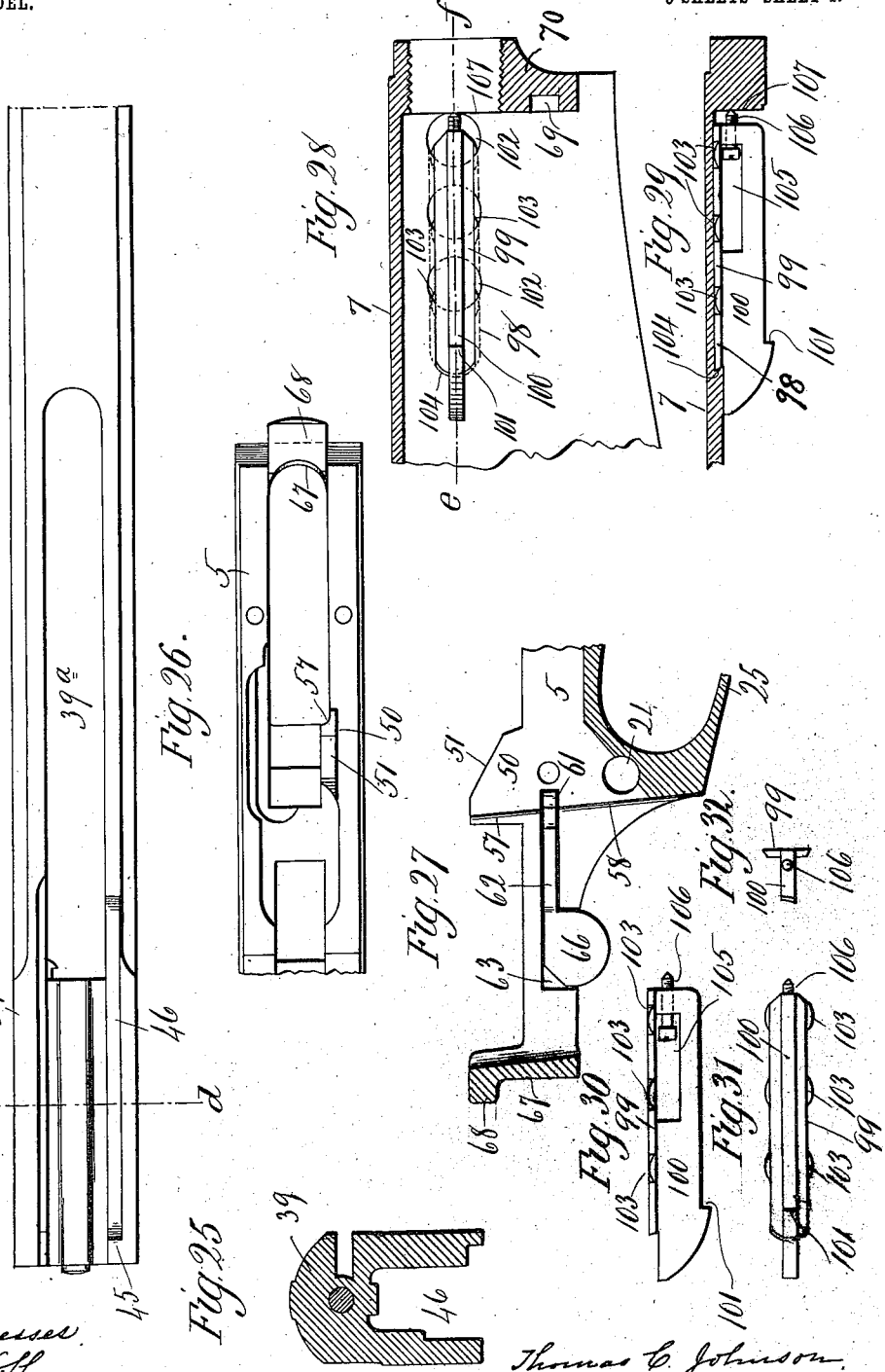

No. 720,698. PATENTED FEB. 17, 1903.
T. C. JOHNSON.
GAS OPERATED FIREARM.
APPLICATION FILED JUNE 23, 1902.
NO MODEL. 5 SHEETS—SHEET 5.
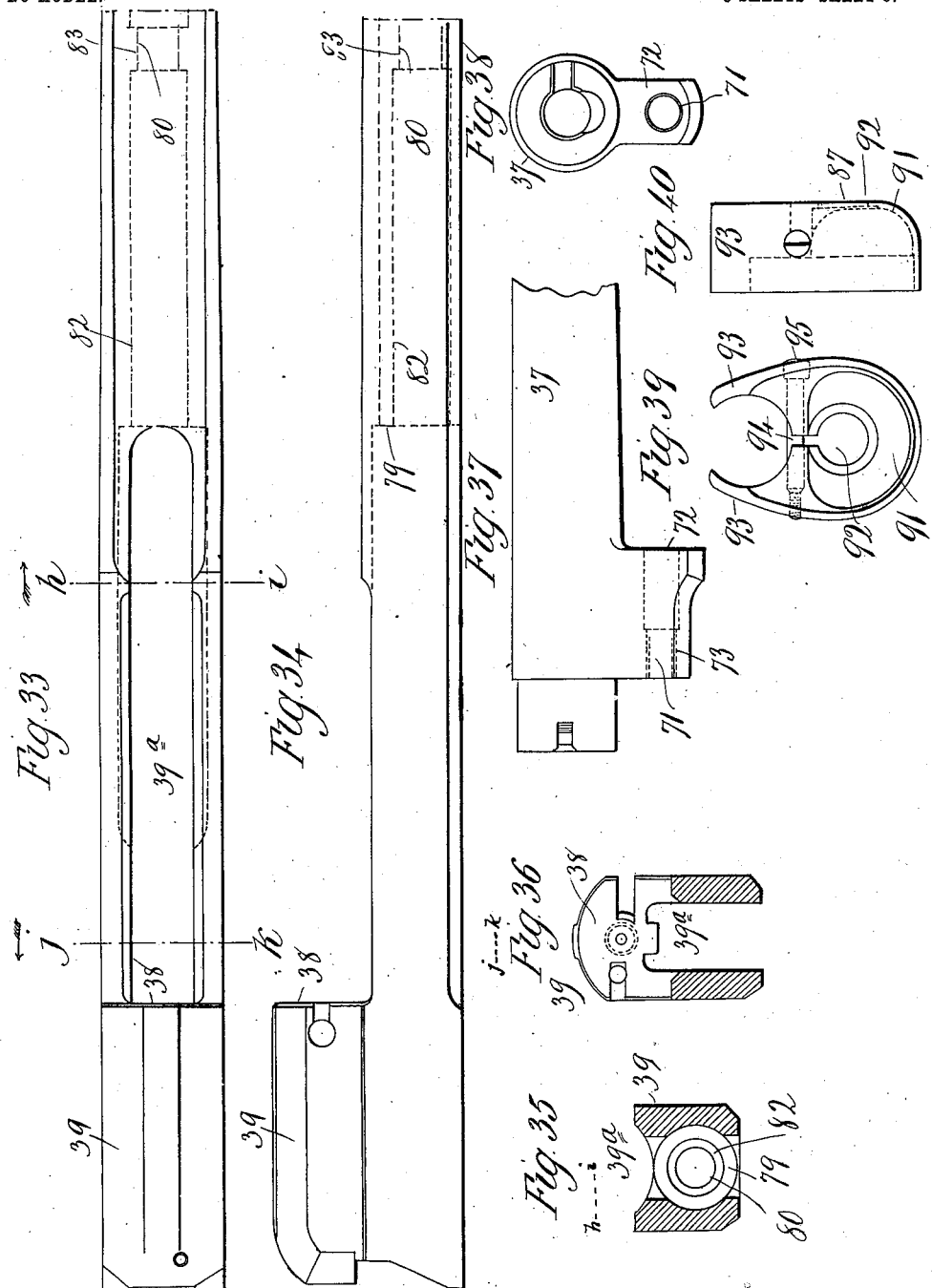

UNITED STATES PATENT OFFICE.

THOMAS C. JOHNSON, OF NEW HAVEN, CONNECTICUT, ASSIGNOR TO WINCHESTER REPEATING ARMS CO., OF NEW HAVEN, CONNECTICUT, A CORPORATION.

GAS-OPERATED FIREARM.

SPECIFICATION forming part of Letters Patent No. 720,698, dated February 17, 1903.

Application filed June 23, 1902. Serial No. 112,908. (No model.)

*To all whom it may concern:*

Be it known that I, THOMAS C. JOHNSON, of New Haven, in the county of New Haven and State of Connecticut, have invented a new and useful Improvement in Automatic Firearms; and I do hereby declare the following, when taken in connection with the accompanying drawings and the figures of reference marked thereon, to be a full, clear, and exact description of the same, and which said drawings constitute part of this specification, and represent, in—

Figure 1, a view in side elevation of an automatic firearm constructed in accordance with my invention; Fig. 2, a broken view, in side elevation, of the arm drawn to full size, showing in particular its tang and the parts assembled therewith, its hammer being in its cocked position and its magazine being in place; Fig. 3, a view in vertical transverse section of the tang on the line $a\ b$ of Fig. 2 looking rearward and shown as it is stripped; Fig. 4, a detached view, in rear elevation, of the frame or receiver shown as stripped; Fig. 5, a broken view of the arm, partly in elevation and partly in central longitudinal section and drawn to half the scale of Fig. 2; Fig. 6, an enlarged broken detail view, in vertical section, showing the take-down screw and the spring-lock provided therefor; Fig. 7, a detached view, in rear elevation, of the take-down screw and the spring-lock therefor, showing the locking-notches in the thumb-piece or button of the former; Fig. 8, a detached view, in side elevation, of the spring-lock for the take-down screw; Fig. 9, a detached broken view, partly in plan and partly in horizontal section, showing the box-magazine and the locking-lever therefor; Fig. 10, a detached plan view of the locking-lever for the box-magazine; Fig. 11, a view thereof in side elevation; Fig. 12, a detached view, in side elevation, of the box-magazine, showing the locking-notch therein; Fig. 13, a detached broken view, partly in elevation and partly in vertical section, showing the automatic timing-lever which prevents the gun from being fired until it is closed and the manual trigger-lock to lock the trigger from being operated until the gun is closed; Fig. 14, a broken view, in vertical section, on the line $x\ y$ of Fig. 13 looking rearward; Fig. 15, a detached view, partly in side elevation and partly in section, of the manual trigger-lock; Fig. 16, a detached end view thereof; Fig. 17, a detached plan view of the trigger; Fig. 18, a view thereof in side elevation; Fig. 19, a view thereof in front elevation; Fig. 20, a detached view, in side elevation, of the automatic timing-lever; Fig. 21, a front end view thereof; Fig. 22, a detached view, in side elevation, of the sear; Fig. 23, a plan view thereof; Fig. 24, a detached broken reverse plan view of the balanced breech block or closure; Fig. 25, a view thereof, in vertical section, on the line $c\ d$ of Fig. 24 looking rearward; Fig. 26, a broken plan view of the lower tang of the gun stripped; Fig. 27, a broken view, partly in vertical section and partly in elevation, of the tang looking from the inside thereof toward its right-hand wall; Fig. 28, a broken view, partly in vertical section and partly in elevation, of the frame or receiver looking toward the inside of its left-hand wall and showing the ejector in place; Fig. 29, a broken view, in horizontal section, on the line $e\ f$ of Fig. 28 looking downward and showing the ejector; Fig. 30, a detached plan view of the ejector; Fig. 31, a detached face view thereof; Fig. 32, an end view thereof; Fig. 33, a broken detached plan view of the balanced breech block or closure; Fig. 34, a corresponding view of the same in side elevation; Fig. 35, a view thereof in transverse section on the line $h\ i$ of Fig. 33 looking forward; Fig. 36, a view in transverse section on the line $j\ k$ of Fig. 33 looking rearward; Fig. 37, a detached broken view of the rear end of the barrel, showing the guide-rod lug thereof; Fig. 38, a rear view of the barrel in elevation; Fig. 39, a detached view, in rear elevation, of the cap-like tip or band; Fig. 40, a view thereof in side elevation.

My invention relates to an improvement in that class of firearms in which the breech mechanism is automatically operated for reloading and recocking the arm by the firing of the same, the object of the present invention being to produce a convenient, safe, and effective arm constructed with particular reference to durability and to reducing the number of parts to the minimum.

With these ends in view my invention consists in an automatic firearm having certain details of construction and combinations of parts, as will be hereinafter described, and pointed out in the claims.

I may here state that my present invention may be considered as an improvement upon the devices respectively shown and described in United States Patent No. 681,481, granted August 27, 1901, on my application; United States Patent No. 694,156, granted February 25, 1902, on my application, and United States Patent No. 694,157, granted February 25, 1902, on my application.

As herein shown, I have embodied several features of my present invention in a detachable-box-magazine take-down gun constructed for the use of large cartridges; but I wish it understood that I do not limit myself to the use of all of the said features of my invention in such a gun, as obviously many of them may be used in other styles of firearms.

In carrying out my invention as herein shown I employ a forwardly and downwardly inclined take-down screw 2, mounted in a take-down lug 3, constituting an upward extension of the forward end of the upper prong 4 of the tang 5 of the gun. The upper edge of the said lug 3 is rounded, so as to fit within a correspondingly-shaped shallow recess 6, formed in the rear end of the receiver 7, which is provided at its rear end with a transversely-arranged web or bridge 8, in which an inclined internally-threaded bushing 9 is mounted for the reception of the threaded forward end of the take-down screw 2. The said bushing 9 is entered into the web 8 from the inner face thereof, and its rear end is formed wth a flaring counterbore 10 for the readier entrance into it of the screw 2. A pin 11, mounted transversely in the take-down screw 2, couples the same with the lug 3, from which it is thus prevented from being pulled out. The forward face of the lug 3 is formed with a transversely-arranged locking-shoulder 12, which when the tang 5 and receiver 7 are in their assembled positions rests upon the upper edge of a rearwardly-projecting semicircular lug 13, surrounding the lower half of the opening 14, formed in the web 8 for the reception of the bushing 9. The said shoulder 12 and lug 13 assist in guiding the tang and receiver as they are brought together and reinforce the joint between them and relieve the take-down screw of strain. At its rear end the screw 2 is provided with a thumb-button 2ª, the edge of which is formed with a series of locking-notches 15, which are entered by a forwardly and downwardly pitched locking-tooth 16, formed upon the spring take-down screw-lock, which is made in one piece and comprises the said tooth 16, a finger-piece 17, and a U-shaped spring 18, the latter terminating in a hook 19, which is entered into a retaining-notch 20, cut in the bottom wall of a forwardly-pitched chamber or hole 21, formed in the tang 5 for the reception of the said U-shaped spring 18. The finger-piece 17 of the take-down spring-lock is located in a recess 22, formed in the prong 4 of the tang 5 and merging at its forward end into the hole 21 aforesaid. Normally the spring 18 maintains the finger-piece 17 in position to keep the locking-tooth 16 entered into one of the locking-notches 15 of the thumb-button 2ª of the take-down screw 2, which is thus positively locked against being turned in either direction. Therefore preparatory to taking down the gun the finger-piece 17 must be pressed downward into the recess 22 until the locking-tooth 16 is cleared from the thumb-button 2ª, which may then be rotated. The same thing must be done in putting the gun together. By pitching the take-down screw and take-down bushing as shown and described I secure economy of space in the length of the receiver of the gun and also locate the thumb-button of the take-down screw so that it better conforms to the general outlines of the gun than if it were located in a vertical plane, as in my prior patents referred to.

For the purpose of positively locking the trigger against movement, and therefore preventing the arm from being accidentally fired when being handled, I employ a longitudinally-movable manual safety or trigger lock 23 in the form of a short heavy cylinder or stud, the same being located in circular openings 24 24, formed for its reception in the opposite walls of the tang at a point directly in front of the trigger-guard 25 thereof. The exposed ends of this safety-lock are knurled or cross-hatched for convenience in operating it as it is pushed transversely into its trigger blocking or locking and trigger clearing or unlocking positions. It is formed in its upper edge with a clearance-slot 26, which when the lock is in its left-hand or trigger-clearing position registers with a locking-finger 27, extending downwardly from the forward end of a locking-arm 28, constituting an extension of the left-hand side wall of the trigger 29, which turns upon a trigger-pin 30, mounted in the tang 5. Then when the trigger is pulled, the said locking-finger enters the said clearance-slot, which is deep enough to permit the trigger to be swung sufficiently to release the hammer 31; but, on the other hand, when the lock 23 is pushed into its right-hand or trigger-blocking position a portion of its surface is brought under and close to the said locking-finger 27. Now, when the trigger is pulled the edge of the locking-finger 27 immediately engages with the full cylindrical surface of the lock 23, whereby the trigger is prevented from being swung sufficiently to release the hammer, and, indeed, almost not at all. Therefore the lock 23 provides an effective safety against the accidental firing of the arm when the same is handled. To prevent it from accidentally moving into either of its two positions, I form two conical recesses 32 in its lower face for the reception of a spring-actuated locking-plunger 33, located in a chamber 34, formed in the tang 5, as clearly shown in Figs. 13 and 14. The exposed end or nose of the plunger 33 is made conical, so that when the lock 23 is pushed in one direction or the other the doubly-inclined web 35, between the two recesses 32, will push the plunger down to permit the lock to be shifted from its trigger-clearing to its trigger-blocking position, and vice versa.

To automatically prevent the gun from being fired under any circumstances until the cartridge has been pushed home in the cartridge-chamber 36 of the barrel 37 by the face 38 of the balanced breech block or closure 39, I employ what I elect to call a "timing-lever" 40, which I mount upon the hammer-pivot 41. This timing-lever is provided with a depending forwardly-extending hook 42, Fig. 20, which coacts, Fig. 13, with a timing-lug 43, Fig. 17, formed upon the outer face of the forward end of the locking-arm 28 of the trigger 29. The said timing-lever is also formed with a forwardly-extending cam-like operating-arm 44, the upper edge of which is engaged for the automatic operation of the lever by a cam-like surface 45, Fig. 13, formed at the rear end of a long recess 46, formed in the lower edge of the left-hand wing of the balanced breech-block 39, whereby the lever is swung on the hammer-pivot 41 and its hook 42 moved rearward and disengaged from the timing-lug 43, so as to permit the trigger to be operated, provided the trigger-lock 23 is at this time in its left-hand or trigger-clearing position. This automatic operation of the timing-lever 40 does not begin until the balanced breech-block 39 is almost in its closed position and is not completed until it reaches that position. Just as soon as the breech-block 39 begins its rearward or opening movement the timing-lever is automatically lifted into its trigger-locking position by a flat spring 47, secured by a screw 48 in a longitudinal slot 49, formed in the left-hand wall of the forward end of the tang. When the spring 47 restores the timing-lever 40 to its locking position, the hook 42 of the lever swings under the timing-lug 43 of the trigger, which it thus prevents from being operated until the gun is again closed.

To prevent the hammer 31 from swinging too far forward when the gun is taken down, I employ a combined hammer-stop and magazine-guide 50. This part rises from the upper edge of the right-hand side of the tang 5 and is formed with a forwardly and upwardly inclined stop-face 51, which coacts with a stop-shoulder 52, located on the right-hand side of the hammer 31, which latter is formed with a cocking-notch 53, entered by the nose of a longitudinally-movable sear 54, mounted upon the trigger-pivot 30, and operated by a sear-spring 55, which is weaker than the hammer-spring 56. If preferred, the said combined hammer-stop and magazine-guide might be located on the left-hand side of the tang.

The forward edge of the combined hammer-stop and magazine-guide 50 is formed with a vertical groove 57, Fig. 27, which constitutes an upward extension of a groove 58, formed in the tang 5 to guide the box-magazine 59, Fig. 12, which is a detachable box-magazine of any approved construction. The rear right-hand corner of the said box-magazine 59 is formed with a retaining or locking notch 60, Fig. 12, for the reception of an inwardly-projecting nose 61, located at the rear end of a horizontally-arranged locking-lever 62, Fig. 10, located in a recess 63, Fig. 9, formed for it in the inner face of the right-hand wall of the tang 5 and mounted upon a pin 64. A spring 65, located in the recess 63, exerts a constant effort to force the nose 61 of the lever inward. At its forward end the lever 62 is provided with a depending finger-piece 66, Figs. 1, 2, and 11, located and arranged so as to be exposed at a point directly below the tang and to lie close to and in the plane of the projecting lower portion of the box-magazine, so that it will be under the thumb when the thumb and fingers are applied to the lower end of the magazine for removing it. When the finger-piece 66 is pressed inward at this time by the thumb, the tension of the spring 65 is overcome and the nose 61 of the lever withdrawn from the locking-notch 60 in the box-magazine. The magazine is then pulled downward and the thumb naturally slides off from the finger-piece of the lever. The unlocking and removal of the magazine thus becomes a continuous movement of the hand, the transition from the act of unlocking the magazine to pulling it away from the arm being practically imperceptible to the user of the arm. When the magazine is inserted into the arm, the nose of the lever 62 rides easily over the smooth right-hand wall of the magazine until the locking-notch 60 is reached, when the nose springs into the notch.

The forward end of the tang 5 is formed with a centrally-arranged upwardly-extending combined magazine-guide and take-down hook 67, the rear face of which is concaved to conform to the curvature of the forward end of the magazine, while its forward edge is formed with a beak 68, Fig. 2, which enters a slot 69, Fig. 5, formed in the rear face of a take-down lug 70, located in the forward end of the receiver 7. It will be understood that the beak 68 of the said take-down hook 67 enters the said slot 69 when the locking-shoulder 12 of the tang slides over the upper edge of the simicircular lug 13 at the rear end of the receiver preparatory to the entrance of the take-down screw 2 into the take-down-screw bushing 9.

At the rear end of the gun-barrel 37 I form a heavy depending recoil-taking and guide-rod lug 71, Figs. 5, 37 and 38, having a recoil abutment-face 72 and also having a longitudinal threaded bore 73 for the reception of the threaded and shouldered rear end 74 of a guide-rod 75, Fig. 5, the forward end of which is formed with a screw-driver slot 76 to adapt it to be turned into place and removed. This lug extends downward into the tang-opening 39ª, Fig. 33, in the breech-block 39. This guide-rod has mounted upon its rear end a buffer composed of two steel washers 77 and two fiber washers 78, located between the same, the rear steel washer being placed against the abutment-face 72, already mentioned. The forward steel washer 77 is impinged upon by an abutment-face 79, Fig. 5, formed toward the forward end of the balanced breech-block 39. The said guide-rod 75 guides the forward end of the balanced breech-block 39 as it moves back and forth, the forward end of the rod passing through a bearing-opening 80, formed toward the forward end of the block. A breech-block-retaining spring 81 encircles the rod and impinges at its rear end against the said forward washer 77 and at its forward end against the forward wall of an annular chamber 82, formed in the forward end of the breech-block for the reception of the said spring 81 and extending forward from the abutment-face 79 of the breech-block to the web 83, containing the bearing-opening 80, already mentioned. When the gun is fired, the spring 81 is compressed and the face 79 impinged against the forward washer 77. The entire shock of recoil is taken between these surfaces, there being a clearance between the rear end of the breech-block 39 and the rear wall of the receiver 7.

For manually opening the arm, which is necessary for the introduction of the first cartridge into the gun-barrel, I employ a plunger 84, provided at its forward end with a button 85, secured in place by a pin 86. This plunger is mounted so as to have free longitudinal movement back and forth in a cap-like band or tip 87, clamped upon the gun-barrel. The rear end of the plunger engages with the forward face of the web 83 of the balanced breech-block 39, which is therefore pushed rearward into its open position against the tension of the spring 81 when the plunger is pushed inward by the user of the gun. A coiled spring 88, located within the plunger and impinging against the slotted forward end of the guide-rod 75, is provided for normally maintaining the plunger at the limit of its forward position, at which time its rear end is just cleared from the forward face of the web 83, as shown in Fig. 5. The clearance-space 89, thus secured, prevents the plunger from being disturbed during the automatic operation of the gun. An external shoulder 90, formed upon the plunger, engages with the inner face of the tip 87 and limits the forward movement of the plunger.

My improved cap-like band or tip 87, Figs. 39 and 40, is formed with a chambered body 91, having a circular bearing-opening 92 for the plunger formed in its front wall. This body has two upwardly-projecting arms 93, the inner edges of which are shaped to conform to the external form of the gun-barrel upon which they are clamped. For this purpose a slot 94 is formed, which leads down centrally between the arms into the bearing-opening 92 aforesaid. The bases of the arms are formed with a transverse screw-hole for the reception of a clamping-screw 95, which also takes into a notch 96, Fig. 5, formed in the barrel to prevent the tip from swinging upon the barrel, as well as from longitudinal movement thereon. It will be observed that the body of the tip is closed in front, except for the bearing-opening 92 of the plunger, and that it forms a symmetrical terminus for the forestock 97, which enters its chamber.

In order to reduce to the minimum the cutting away of the left-hand wall of the receiver 7 for the reception of the ejector, as well as to facilitate the introduction and removal of the same and to more firmly secure it in place, I form in the inner face of the left-hand wall of the receiver a recess 98, Fig. 28, a trifle longer than the ejector-base 99 of the ejector 100, Figs. 29, 30, and 31, which is formed integral with and stands at a right angle to the said base and at its rear end has an ejecting-nose 101. The walls of the recess 98 are undercut, and to permit the ejector-base 99 to be inserted laterally into and in the same way removed from the recess 98 the undercut walls thereof are formed with segmental clearance-openings 102, arranged in pairs, of which three are shown in Fig. 28. These clearance openings or cuts extend inward slightly below the bottom wall of the recess. The edges of the ejector-base 99 are formed with corresponding segmental beveled retaining-tongues 103, arranged in pairs and corresponding in form and location to the segmental clearance-openings 102. To secure the ejector in position, the retaining-tongues 103 are entered into the clearance-openings 102, after which the ejector is shoved bodily rearward, so as to cause the said tongues to enter under those portions of the undercut walls lying between the said clearance-openings. The curved rear end of the ejector-base is beveled and abuts against a correspondingly-curved undercut terminal shoulder 104, located at the rear end of the recess 98. This shoulder 104 constitutes a rear abutment for the ejector, which is thus held against the constant and severe rearward thrust imposed upon it much more solidly than it could be held by screws. The forward end of the ejector is formed with a slot 105 for the reception of a screw 106, which abuts against the inner face 107 of the forward end wall of the receiver 7, whereby the ejector is crowded rearwardly and maintained in place.

It is apparent that in carrying out my invention changes from the construction herein shown and described may be made, and I would therefore have it understood that I do not limit myself to the construction and combination of parts shown, but hold myself at liberty to make such departures therefrom as fairly fall within the spirit and scope of my invention.

Having fully described my invention, what I claim as new, and desire to secure by Letters Patent, is—

1. In a take-down firearm, the combination with the receiver and the tang thereof, of a forwardly and downwardly inclined take-down screw mounted in the tang and entering the receiver.

2. In a take-down firearm, the combination with the receiver and the tang thereof, of a take-down screw mounted in the tang and entering the receiver, and a lock coacting with the screw and comprising a tooth, a finger-piece and a spring, all made integral with each other.

3. In a take-down firearm, the combination with the receiver and the tang thereof, of a take-down screw entering the receiver, and a lock made in one piece and comprising a finger-piece and a U-shaped spring and adapted to engage with the screw for holding the same against rotation.

4. In a take-down firearm, the combination with the trigger thereof, of a transversely-arranged longitudinally-movable, manual trigger-lock mounted forward of the finger portion of the trigger and projecting beyond one of the side walls of the frame and formed with a clearance-slot for the reception of a portion of the trigger the operation of which it blocks when the slot is not in position to receive the trigger.

5. In a firearm, the combination with the trigger thereof, of a longitudinally-movable trigger-lock formed with a clearance-slot for the reception of a portion of the trigger, and with two locking-recesses, and a spring-actuated plunger coacting with the recesses for securing the said lock in its trigger-clearing and trigger-blocking positions.

6. In a firearm, the combination with the tang thereof, of a trigger mounted therein and having a forwardly-projecting locking-arm, a trigger-lock mounted in the tang for transverse movement therein beyond one of the side walls of which it projects and formed with a clearance-slot for the reception of a portion of the said arm the movement of which the lock blocks except when the said slot is alined with the said arm.

7. In a firearm, the combination with the trigger thereof, of an automatic timing-lever located forward of the finger portion of the trigger and coacting with the trigger to lock it, and means for automatically operating the timing-lever to unlock the trigger just as the arm is closed.

8. In a firearm, the combination with a longitudinally-movable breech-block, of a trigger, and an automatic timing-lever located forward of the finger portion of the trigger and coacting with the trigger to lock the same and operated upon by the breech-block just as the arm is closed, for unlocking the trigger.

9. In a firearm, the combination with the trigger thereof, of an automatic timing-lever located forward of the finger portion of the trigger and formed with a depending hook to coact with the trigger and with a forwardly-projecting unlocking-arm, and means coacting with the said arm for operating the lever to release the trigger just as the firearm is closed.

10. In a firearm, the combination with a trigger having a forwardly-projecting locking-arm furnished with a locking-lug, of a timing-lever provided with a depending hook coacting with the said lug and with a forwardly-projecting unlocking-arm, and means coacting with the said arm to clear the said hook from the said lug just as the firearm is closed.

11. In a firearm, the combination with a trigger having a forwardly-projecting locking-arm and a locking-lug, of a transversely-arranged longitudinally-movable stud-like trigger-lock located forward of the finger portion of the trigger and formed with a clearance-slot for the reception of a portion of the said arm the operation of which it blocks except when the said slot is alined with the said arm, an automatic timing-lever formed with a hook coacting with the said lug and with a forwardly-projecting operating-arm, and means engaging the said arm to disengage the hook of the lever from the lug of the lock just as the firearm is closed.

12. In a firearm, the combination with a tang provided with an upwardly-projecting combined hammer-stop and box-magazine guide, of a hammer formed with a stop-shoulder coacting with the said combined part for limiting the forward movement of the hammer, and a box-magazine coacting with the forward edge of the said part which constitutes a guide for it.

13. In a box-magazine take-down firearm, the combination with a receiver formed at its forward end with a take-down lug having a slot in its rear wall and provided at its rear end with a take-down bushing, of a tang formed at its rear end with a take-down lug, and at its forward end with an upwardly-projecting combined magazine-guide and take-down hook coacting with the slot in the said lug of the receiver, and a take-down screw mounted in the take-down lug of the tang and entering the said bushing in the rear end of the receiver.

14. In a firearm, the combination with a receiver formed at its rear end with a locking-lug, of a tang formed with an upwardly-projecting take-down lug provided with a forwardly-projecting transversely-arranged locking-shoulder coacting with the said lug at the rear end of the receiver, and a take-down screw mounted in the said lug of the tang and entering the receiver.

15. In a take-down firearm, the combination with a receiver formed at its rear end with a rearwardly-projecting segmental locking-lug, of a tang provided with an upwardly-projecting take-down lug formed with a forwardly-projecting transversely-arranged locking-shoulder coacting with the said lug of the receiver, and a take-down screw mounted in the said take-down lug of the tang and entering the rear end of the receiver.

16. In a firearm, the combination with the tang thereof, of a horizontally-arranged box-magazine locking-lever mounted therein provided at its forward end with an exposed finger-piece lying close to the side wall of the magazine when the same is in position and provided at its rear end with a nose for engagement with the magazine.

17. In an automatic firearm, the combination with a gun-barrel provided at its rear end with an integral depending guide-rod lug, of a longitudinally-movable balanced breech-block, a portion of which extends forward under the barrel, a guide-rod mounted in the said guide-rod lug into which its rear end is entered, and a spring encircling the said rod for returning the block to its closed position.

18. In an automatic firearm, the combination with a gun-barrel formed at its rear end with a depending guide-rod lug, of a longitudinally-movable balanced breech-block extending forward under the barrel, a guide-rod for the said block, entered at its rear end into the said guide-rod lug the forward end of which constitutes a recoil abutment-face, buffer-washers mounted upon the rear end of the said rod and bearing against the said recoil abutment-face, and a spring encircling the said rod for returning the block to its closed position.

19. In a firearm, the combination with the barrel and the forestock thereof, of a cap-like band or tip having a chambered body closed in front and opening rearwardly for the reception of the forestock and formed with a circular opening and with two upwardly-extending clamping-arms between which a slot extends downwardly into the said opening, and a clamping-screw passing through the base of the said arms for clamping the tip upon the barrel.

20. In a firearm, the combination with a receiver having the inner face of its left-hand wall formed with a recess the walls of which are undercut and formed with lateral clearance-openings, of an ejector having its base formed on its edges with tongues constructed and arranged in correspondence with the said clearance-openings into which the tongues are entered in securing the ejector in place.

21. In a firearm, the combination with a receiver having the inner face of its left-hand wall provided with a recess, of an ejector adapted to be entered into the said recess, and a pressure-screw mounted in the ejector and engaging with a portion of the receiver to crowd the ejector rearwardly and hold it firmly in place.

22. In a firearm, the combination with a receiver having the inner face of its left-hand wall formed with a recess the walls of which are undercut and formed with lateral clearance-openings, of an ejector the base of which is formed upon its edges with retaining-tongues corresponding in form and location to the said openings into which they are entered, and the rear end of the said base being solidly held against the rear end wall of the said recess; and a pressure-screw mounted in the forward end of the ejector and pushing it rearwardly so as to firmly hold it in place.

23. In a firearm, the combination with a barrel provided with an integral depending recoil-taking lug, of a longitudinally-movable balanced breech-block coacting with the said lug which takes the recoil of the said block, and a spring coacting with the said block to return it after it has been forced rearward by the recoil.

24. In a firearm, the combination with a barrel provided with an integral recoil-taking depending lug, of a longitudinally-movable balanced breech-block having an opening receiving the said lug which takes the recoil of the block, and a spring coacting with the said block to return it after it has been forced rearward by the recoil.

In testimony whereof I have signed this specification in the presence of two subscribing witnesses.

THOMAS C. JOHNSON.

Witnesses:
DANIEL H. VEADER,
H. F. BEEBE.